United States Patent [19]
Buchanan et al.

[11] Patent Number: 5,695,644
[45] Date of Patent: Dec. 9, 1997

[54] FLUID TREATMENT DEVICE AND METHOD

[75] Inventors: John Christopher Sutherland Buchanan, Ringwood; Christopher Michael David Joslin, Dorchester, both of United Kingdom

[73] Assignee: Ion Enterprises Limited, Dorchester, United Kingdom

[21] Appl. No.: 481,383

[22] PCT Filed: Jan. 24, 1994

[86] PCT No.: PCT/GB94/00129

§ 371 Date: Jul. 24, 1995

§ 102(e) Date: Jul. 24, 1995

[87] PCT Pub. No.: WO94/17000

PCT Pub. Date: Aug. 4, 1994

[30] Foreign Application Priority Data

Jan. 25, 1993 [GB] United Kingdom ............... 9301384
Nov. 15, 1993 [GB] United Kingdom ............... 9323546
Dec. 24, 1993 [GB] United Kingdom ............... 9326455

[51] Int. Cl.$^6$ ................................................ C02F 1/48
[52] U.S. Cl. ................. 210/696; 210/748; 210/198.1; 210/252; 204/554; 204/660; 204/666
[58] Field of Search ............................... 210/696, 748, 210/198.1, 252; 204/554, 660, 666

[56] References Cited

U.S. PATENT DOCUMENTS 3,919,068  11/1975  Gary .......................................... 204/197

FOREIGN PATENT DOCUMENTS

0034079       8/1981   European Pat. Off. .
2222560      10/1974   France .
2 127 581     4/1981   United Kingdom .
WO 81/02846  10/1981   WIPO .

Primary Examiner—Neil McCarthy
Attorney, Agent, or Firm—Sheridan Ross P.C.

[57] ABSTRACT

A fluid treatment device, especially for reducing or removing the effects of hard water, has a fluid inlet, a fluid outlet, and a cavity extending between the inlet and the outlet. A dielectric channel separator (preferably of plastics material, more preferably PTFE) is located in the cavity between the inlet and the outlet and extends at least part way along the cavity. The dielectric channel separator divides the cavity into a plurality of elongate channels which are mutually coextensive for at least part of their length in the direction of fluid flow from the inlet to the outlet and are at least partially bounded by dielectric material. A metallic channel separator, preferably of zinc, can also be provided to provide a degree of protection against corrosion. The channel separators are preferably configured to encourage turbulence in the fluid flowing through the device.

29 Claims, 9 Drawing Sheets

FLUID TREATMENT DEVICE AND METHOD

This invention relates to fluid treatment devices and methods.

The invention finds particular, but not exclusive application to the treatment of water, for example mains-supplied drinking water, to prevent the formation of hard water scale and/or corrosion in water pipes and/or within machines designed to heat or otherwise process water. The invention also finds application to the treatment of other fluids, and in particular liquids, whether potable or non-potable.

Many different types of water conditioning appliances, employing various electromagnetic, magnetic, galvanic and other effects, have been tried with varying degrees of success. Examples of prior art conditioning techniques are explained briefly below.

Both cationic and anionic ion exchange resins have found significant use in the treatment of water. For example, in the most commonly used form, hard water is passed through an ion exchange resin which causes the offending salts of calcium and magnesium to be transformed into the corresponding sodium salts. However, in view of the concerns about sodium consumption, such conditioners are not desirable for use for drinking water. Also, they require regular maintenance.

Magnetic water conditioners employ an electro-motive force which is induced by passing the water to be conditioned, which is a conductor, through a magnetic field. Although magnetic conditioners apparently give reasonable results in some installations, the results which can be achieved are unpredictable and variable.

Galvanic devices usually incorporate a combination of electrodes which may be electrically connected either directly or through a resistor, with the aim of passing a current through the water. Different combinations of conductive elements have been employed in different prior art devices, including carbon, zinc, aluminium, copper, magnesium, etc. In general terms, galvanic conditioners set out to create an e.m.f. which will act across the flow of water within a water conditioning device so as to cause coagulation of colloidal substances and the subsequent early precipitation of scale-producing substances. In tests, these types of device were found to be more effective when the dissimilar elements used in their construction were connected together to provide a sacrificial anode. It is believed that metallic ions released into the water supply act in some way as initiators in the process of precipitating scale-producing substances. This view is supported in that leaving off the electrical connection was found in tests to result in poorer performance. Another advantage of electrically connecting dissimilar metals is that a degree of corrosion protection is afforded to the water system.

Applied voltage conditioners are generally similar to the type of conditioners described above as galvanic conditioners, except that a direct current is applied across two dissimilar electrodes, one of which is usually aluminium or zinc. In such a device a greater quantity of metal ions and therefore a greater number initiators for scale precipitation are provided than in a galvanic conditioner without an external source of direct current. However, in such conditioners it is necessary to provide a battery or other source of direct current and the sacrificial loss of the anode is increased.

To avoid or reduce the sacrificial effect, it has been proposed to coat the electrodes with a plastics or oxide dielectric layer. As, in such cases, the dielectric layer will at least substantially prevent the flow of ions into the fluid, the sacrificial effect is no longer present. It is understood that such devices are claimed to create a capacitance effect across the passing water. However, in such devices, the need remains to apply external voltages remain.

It will be appreciated that many different approaches have been employed for conditioning/treating water, for example to reduce the formation of hard scale in pipework and in water heating devices. The existing techniques all involve disadvantages. In some case the disadvantages are in the form of the need regularly to replace an active component or to supply an external voltage, and in other cases the disadvantages relate to poor levels of effectiveness or reliability.

Accordingly, an object of the invention is to provide a water treatment device which overcomes or mitigates the disadvantages of the prior art techniques and devices.

In accordance with one aspect of the invention there is provided a passive fluid treatment device comprising a fluid inlet, a fluid outlet, means defining a cavity extending between said inlet and said outlet, and dielectric channel separator means located in said cavity between said inlet and said outlet and extending at least part way along said cavity, said dielectric channel separator means dividing said cavity into a plurality of elongate channels which are mutually coextensive for at least part of their length in the direction of flow of said fluid from said inlet to said outlet and are at least partially bounded by dielectric material.

The device is passive in that no external source of electricity or heat need be provided. It has been found that a fluid treatment device with this construction causes significant precipitation of particles in water passed through the device. By the early precipitation of colloidal and dissolved scale-producing substances from water, the growth of hard crystalline aragonite and calcite formations may be eliminated from water systems, the offending constituents being either flushed through or deposited as an easily removed soft sludge. It is believed that a number of effects may be contributing to the performance of the device. It is believed that there is an interaction between the dielectric material and the fluid (e.g., water). This may be as a result of a static type effect as the water flows over the dielectric, this causing salts to precipitate out of solution. Dividing the cavity into a plurality of channels has the effect of increasing the surface area in contact with the fluid, thus increasing any effect produced. Also, where the fluid is a liquid (e.g., water), it is believed that pressure changes within the fluid as it is divided into the plurality of channels and as it emerges from the plurality of channels can cause the formation of small bubbles of any gases dissolved in the fluid which can act as precipitation sites for dissolved salts and colloids. Also, when normal fluid pressure is restored in, for example, pipework downstream of the device, it is believed that shock waves generated as the bubbles collapse can, possibly in combination with fluid turbulence caused by the device, assist in breaking up any pre-existing scale in the pipework downstream of the device.

Thus, this invention provides a method and means of preventing hard water scale deposition in water pipes and equipment involving the use of liquids such as water, although the beneficial effects may be utilised in any liquids where early precipitation of suspended or dissolved substances is desired.

It has been found that where a plastics material is used as the dielectric, improved results are obtained. This supports the view that some form of static electrical effect is present. Particularly effective results have been obtained where the plastics material is polytetrafluoroethylene (PTFE). In addition, this material has the advantage that it is possible to obtain a smooth, non-stick surface which reduces the possibility of the channels becoming clogged.

In one preferred embodiment of the invention, said dielectric channel separator means comprises a block of dielectric material having a cross-section to fit within said cavity, said block of dielectric material being formed with a plurality of elongate bores extending in said direction of flow, each bore defining a respective one of said channels. This construction enables a large number of separate channels to be provided, so that the cross-sectional surface area of the channels greatly exceeds that of the cavity.

Preferably, an upstream end/or a downstream end face of said block of dielectric material is concave. This means that where the device includes at least two dielectric channel separator means, one after the other in said flow direction, the opposed concave end faces of adjacent dielectric channel separator means define a turbulence chamber between adjacent said dielectric channel separator means to increase the turbulence effects.

In a second preferred embodiment of the invention, said dielectric channel separator means comprises an elongate dielectric core extending substantially in said flow direction, a plurality of dielectric flanges extending outwardly therefrom and a dielectric tubular member configured to fit within said cavity, said tubular member being formed integrally with an outer end of said outwardly extending flanges or cooperating with said outer end of said outwardly extending flanges to define a plurality of channels about said core, which channels extend in said flow direction. This construction enables a lower overall diameter of the device for a given total channel cross-sectional area, than with the first embodiment, as the dielectric structure will normally involve less material.

Preferably, said dielectric channel separator means extends part way along said cavity in said flow direction and a metallic channel defining means extends over a further part of said cavity in said flow direction between said dielectric channel separator means and said inlet or between said dielectric channel separator means and said outlet. By selecting a metal appropriate as a sacrificial anode, e.g. zinc, the device can also provide a degree of protection against corrosion when it is installed in a pipework system.

The metallic channel defining means may define a single channel or in alternative embodiments may divide said cavity into a plurality of second elongate channels which are mutually coextensive for at least part of their length in said flow direction, said metallic channel defining means comprising a block of metal formed with a plurality of bores extending in said flow direction, each bore defining a respective one of said second channels.

Preferably, also, an upstream and/or a downstream end face of said block of metal is concave. By arranging that said metallic channel defining means is located adjacent to a said dielectric channel separator means, either before or after said dielectric channel separator means in said flow direction, opposed concave end faces of said dielectric channel separator means and said metallic channel defining means can define a turbulence chamber therebetween.

In one embodiment, a first said metallic channel defining means is located in said cavity adjacent said inlet and a second said metallic channel defining means is located in said cavity adjacent said outlet, with one or more dielectric channel separator means being located between said first and second metallic channel defining means.

Preferably, means are provided for ensuring good electrical contact between said metallic channel defining means and a metal component of a housing or end cap of said device. Such means may take the form of mutually cooperating screw threads. Alternatively, or in addition, such means can comprise mechanical means for increasing contact pressure between said metallic channel defining means and said metallic component and/or for causing scoring or penetration of said metallic channel defining means and/or said metallic component. In addition, sealing means can be provided for keeping a contact area and/or components dry.

Where a plurality of channel separator means are located one after another in said flow direction in said cavity, each channel separator means can comprise aligning means (e.g. a castellated edge) for aligning said channels of adjacent channel separator means. Preferably, an edge of at least one channel opening at an upstream or a downstream end of an end face of a channel separator means is sharp, or otherwise formed such as to encourage turbulent flow of a fluid entering or exiting via said opening.

In order that a device as defined above can be mounted in-line in a pipeline, the device preferably comprises connecting means at said inlet and/or said outlet for connecting said device to said pipeline.

In one embodiment, said connecting means comprises a flange with bolt holes for cooperating with a flange on a connecting section of pipe.

Alternatively, said connecting means comprises a screw fitting for connection to a co-operating fitting on a connecting section of pipe.

Preferably, said connecting means comprises an end cap having a screw thread and either said means for defining a cavity or a housing containing said means defining a cavity has a screw thread for cooperating with said screw thread on said end cap for removably screwing said end cap on to said means defining said cavity or to said housing. This enables the channel separator means to be removed and replaced if necessary, without replacing the whole unit.

In one preferred construction, to be mounted in-line in a pipeline, said device comprising connecting means at said inlet and/or said outlet for connecting said device to said pipeline, wherein said connecting means comprises a metallic end cap having a screw thread and said means defining a cavity, or a housing containing said means defining a cavity, is provided with a screw thread for cooperating with said screw thread on said end cap for removably screwing said end cap on to said means defining said cavity, or to said housing, said dielectric channel separator means has a degree of resilience and said dielectric channel separator means and metallic channel defining means are configured to be slightly over-length whereby, on screwing on said end cap(s), said ridge is urged to cut into a surface of an adjacent end cap to provide good electrical connection between said end caps and said metallic channel defining means.

In another preferred embodiment, the device comprises two metallic housing portions with mutually cooperating screw threads for enabling said housing portions to be screwed together. In this embodiment at least one metallic channel defining member and at least two dielectric channel separators are provided, said metallic channel defining member being located within said cavity so as to span a join between said two housing portions where the latter are screwed together, said metallic channel defining member comprising sealing means for ensuring a dry electrical contact between said metallic channel defining member and said housing portions.

The invention also provides a pipework system comprising a device as defined above connected in a pipeline. Preferably the combined cross-sectional area of said channels is not less than the cross sectional area of the pipeline connected thereto to avoid a significant back pressure being generated within the pipework system. However, a smaller cross-sectional area for the channels could be desirable in certain circumstances, e.g. to deliberately increase the pressure changes within the device.

In accordance with another aspect of the invention, there is provided a method of treating or conditioning water or other fluids comprising passing said water or fluid through a device as defined above.

Exemplary embodiments of the invention will be described hereinafter, by way of example only, with reference to the accompanying drawings where like reference signs relate to like elements and in which.

Figure 1A:
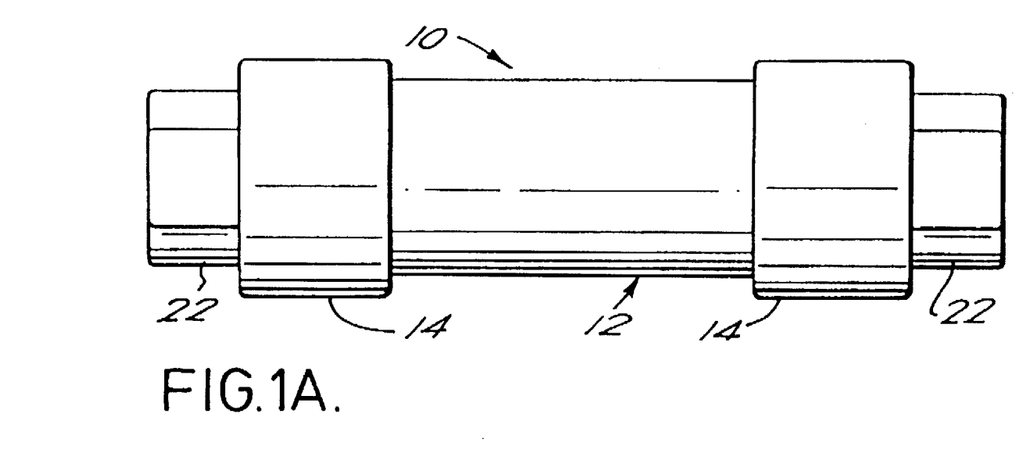
FIGS. 1A, 1B and 1C are a side view, an end view and a cross-sectional view, respectively, of a first embodiment of the invention.

FIG. 1 is a schematic illustration of a first embodiment of a water treatment device in accordance with the invention. FIG. 1a is a side view of this first embodiment 10. It comprises a generally cylindrical body, or housing, 12 which is preferably of a plastics material such as ABS. At either end of the cylindrical housing 12, end caps 14 are provided. The end caps 14 are preferably made of brass, but could be made of another metal or, for example, of a plastics material. The end caps are provided for connecting the device in line in a pipeline or other water carrying conduit.

When the invention is used for treating water, the pipework may be part of a water mains supply system, part of an appliance (e.g., a shower hose), part of the pipework within a machine (for example a drinks dispenser, a car wash, and so on), or any other water supply system. In the embodiments to be described below, it is assumed that the device is to be used for treating mains supply tap water. It is understood, however, that the invention is not limited to the treatment of water, and could be used for the treatment of other liquids and fluids as appropriate.

Figure 1B:
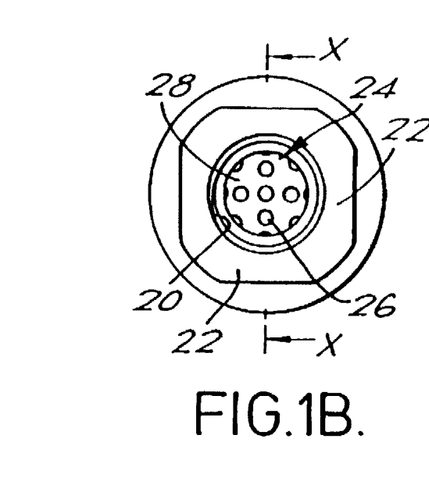

FIG. 1B shows an end view of the device of FIG. 1A. FIG. 1B shows the end of the end cap 14 with a boss 22 formed with flat surfaces to assist in turning the end caps for attachment of the end caps to the body 12 as will be described hereinafter, and for connecting the device to a co-operating coupling on an adjoining piece of pipework. The boss 22 is formed with an internal thread 20 for connecting to such a coupling on the adjoining pipework.

Figure 1C:
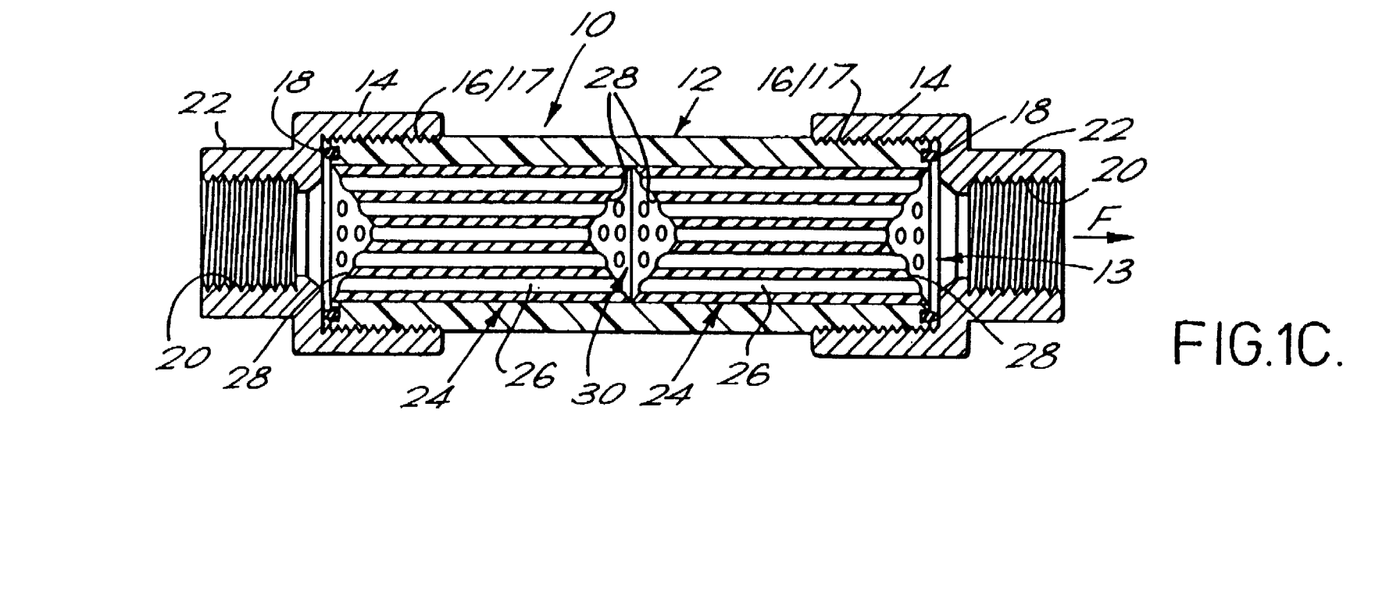

FIG. 1C is a cross sectional view through the device of FIGS. 1A and 1B taken along the line X—X in FIG. 1B.

As viewed in FIG. 1C, it can be seen that the end caps 14 are additionally provided with an internal screw thread 16 for co-operating with a thread 17 provided on the exterior of the body 12 to enable the end cap to be removably screwed onto the body 12. The removability of the end caps facilitates the changing of a channel separator should this become clogged with debris, for example. An O-ring seal 18 is provided to provide good sealing engagement between the end cap and the body 12.

Located within the housing 12 are, in the present embodiment, two channel separators 24. Each channel separator 24 is made of a solid block of dielectric material, preferably plastics material, and more preferably polytetrafluoroethylene, and is formed with a plurality of bores 26 defining separate channels. In use, water lot another fluid as appropriate, as mentioned above), flowing along the pipework is caused to separate and flow along the separate channels from an upstream, to a downstream end face 28 of the channel separator 24 in a flow direction F (e.g. from left to right as viewed in FIG. 1C). In view of the use of dielectric materials in the construction of the present embodiment of a water treatment device, it is desirable where the device is to be connected in metal (e.g., copper) pipework which needs to be earthed, that a metallic earthing bridge is provided between adjacent sections of pipework externally to the water treatment device to ensure earthing continuity.

The external cross-sectional shape of the channel separators 24 is configured to fit within the passage, or cavity 13 formed by the interior wall of the body 12. The end faces of the channel separators 24 are concave (e.g. with a conical or dished shape), such that when two channel separators 24 are placed one after the other, a chamber 30 is defined between those members, which chamber 30 encourages turbulent motion of the water passing through the device and the mixing of the water from respective channels 26.

Figure 2A:
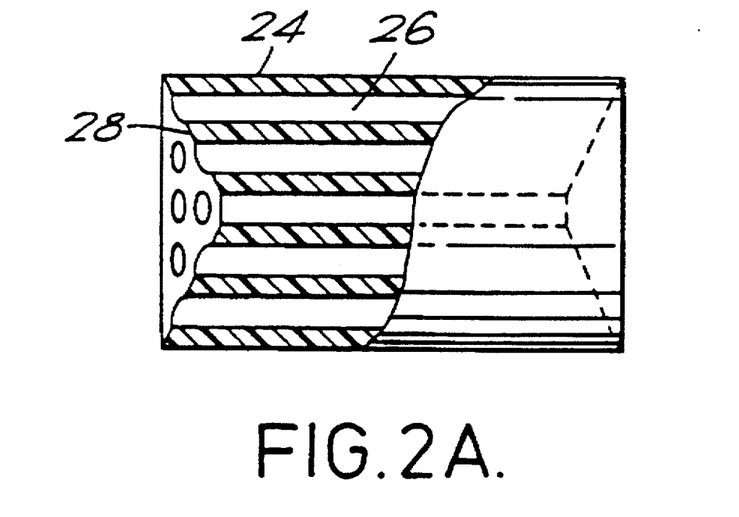
FIGS. 2A and 2B is a part cross-sectional view and a perspective view, respectively, of a component of the embodiment of FIG. 1.
Figure 2B:
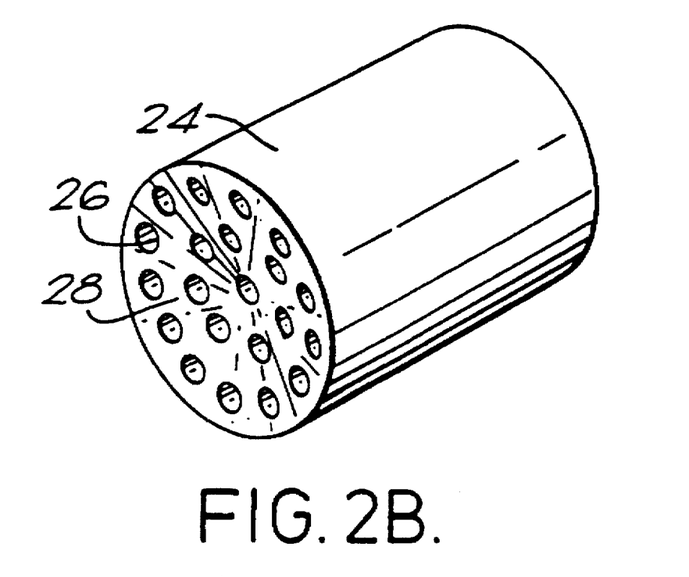

FIG. 2 illustrates, in more detail, one of the channel separators 24. FIG. 2A is a part-sectional view through a channel separator, and FIG. 2B is a perspective view of a channel separator. It can be seen that the channel separator is generally cylindrical in shape and is formed of a solid block of material with a plurality of small bores 26 passing through the length thereof. In the present embodiment, each of the end faces 28 is concave. In other embodiments, however, the end faces need not be concave. Alternatively, one end face may be concave where it is intended to abut against a corresponding concave face of an adjacent channel separator in order to define a turbulence chamber as described with reference to FIG. 1.

It will be appreciated from a comparison of FIGS. 1, 2 and 3, which show different numbers of bores 26, that the number of channels and their total cross-sectional area may be chosen to suit the water conditions for a particular installation.

Preferably, the inlets and the outlets to the individual channels 26 are formed with a sharp edge, or with a ridge or other structure, to encourage turbulence and pressure changes in the water as it flow into and exits from the channels.

The interior of the channels are preferably smooth to reduce the possibility of deposits building up in the channels. To this end, and to facilitate construction, the channels 26 are preferably straight and of circular cross-section. However, they could alternatively be formed with structures and or shaped to further encourage turbulence and pressure changes in the water as it flows along them. The channels could, for example, be given a spiral overall or internal configuration to encourage a swirling motion in the water as it exits from the channel separators 24 and from the device 10.

The ends of the channel separators could be provided with structures to ensure proper alignment of the channels, e.g. by mutually engaging castellations (not shown).

FIG. 1 illustrated two channel separators 24 placed one after the other in the flow direction F. However, other numbers of channel separators may be provided, for example there need only be one channel separator in a simple embodiment, or there could be more than two in a larger embodiment.

FIG. 3 illustrates a second embodiment 50 of the invention where, in addition to the channel separators 24 illustrated in FIGS. 1 and 2, additional metallic channel separators 40 are provided.

Figure 3A:
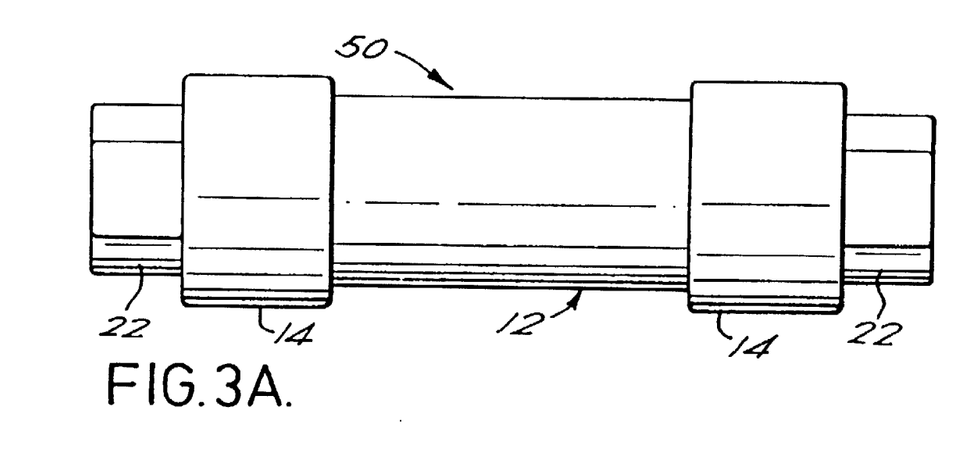
FIGS. 3A, 3B and 3C are a side view, an end view and a cross-sectional view, respectively, of a second embodiment of the invention.
Figure 3B:
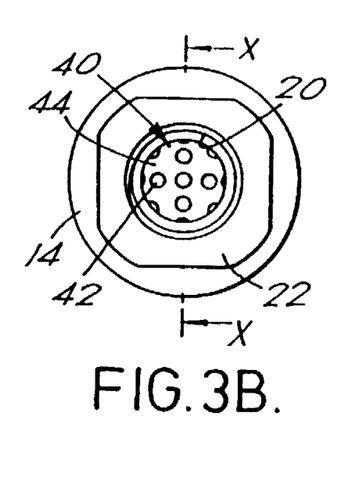
Figure 3C:
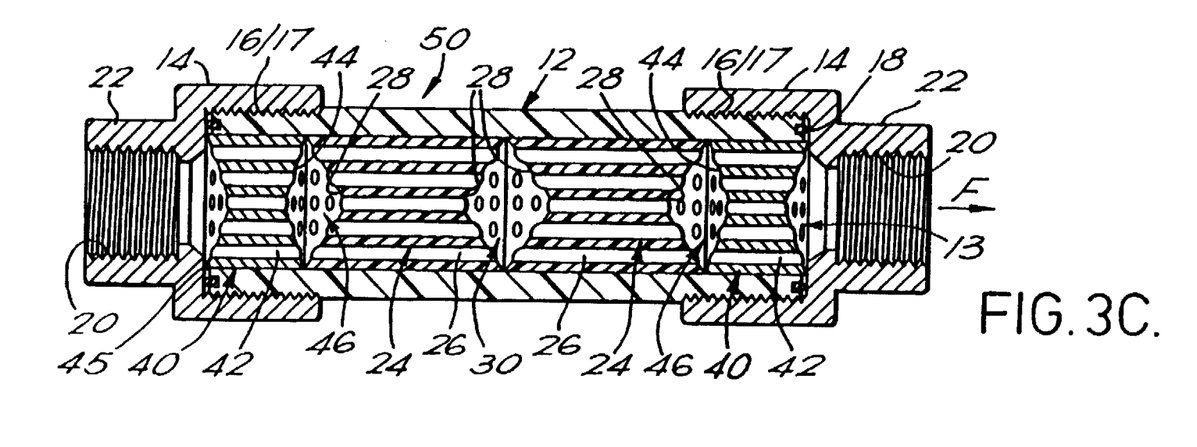

FIGS. 3A and 3B represent a side view and an end view of the second embodiment of the invention. FIG. 3C illustrates a cross-sectional view of the device of FIGS. 3A and 3B as viewed along the line X—X. Like reference signs represent like elements and therefore these will not be described in detail again. Also, variants described with respect to FIGS. 1 and 2 can also apply to the embodiment of FIG. 3, so these will not be described again.

FIG. 3C illustrates an embodiment where two dielectric channel separators 24 are provided in a central region of the cavity or passage 13 within the housing 12 with metallic channel separators 40 located at either end of that cavity. Each of the channel separators 40 has a form generally similar to that of the dielectric channel separators 24 although in the particular embodiment illustrated, they have a shorter axial length than the dielectric channel separators 24. Thus, each of the metallic channel separators 40 comprises a plurality of channels 42 extending between the end faces thereof. The end faces of the metallic channel separators 40 can be concave, so that, where an end face 44 of a metallic channel separator is adjacent to an end face 28 of a dielectric channel separator 24, a turbulence chamber 46 is formed. As described above, this assists in providing turbulent flow and for mixing of the flow of the water passing along the individual channels. The bores of the channels defining member 40 may be configured to enhance the generation of turbulence as described above.

The metallic channel separator is preferably formed of an electro-positive metal suitable for forming a sacrificial anode. Thus, by electrically connecting the sacrificial anode to the pipework connected to the device 50, it is possible to provide a degree of protection against corrosion within a pipework system. A suitable material for the metallic channel separators 40 is zinc, although other suitable metals may be used instead. It appears that an important requirement in the use of galvanic water conditioners is a large surface area of the electrode(s). It will be appreciated that the construction of the metallic channel separator 40 provides a large surface area of zinc to this effect.

In order to provide a good electrical connection between the metallic channel separator 40 and the end cap 14, the channel separator, or the end cap 14, are preferably formed with a sharp circumferentially extending ridge in the area of their mutually contacting surfaces. Thus, in the particular embodiment shown, the metallic channel separator 40 is provided with a circumferentially extending sharp ridge 45. The total length of the metallic and dielectric channel separators 40 and 24, is selected slightly to exceed the length of the cavity within the body 12 so that, when the end caps are screwed onto the end of the body 12, the sharp ridges cut into the surface of the end caps 14 creating a good clean electrical contact between the metallic channel separators 40 and the end faces. This process is assisted by the choice of a dielectric material which has a degree of resilience, this helping to urge the ridge 45 on the metallic channel separator 40 into the surface of the end caps 14 as those caps are screwed on. Wetting of the joint and subsequent corrosion at the junction can be prevented by the use of a liquid plastic sealing compound applied prior to assembly and before the brass cuts into the zinc.

Figure 4A:
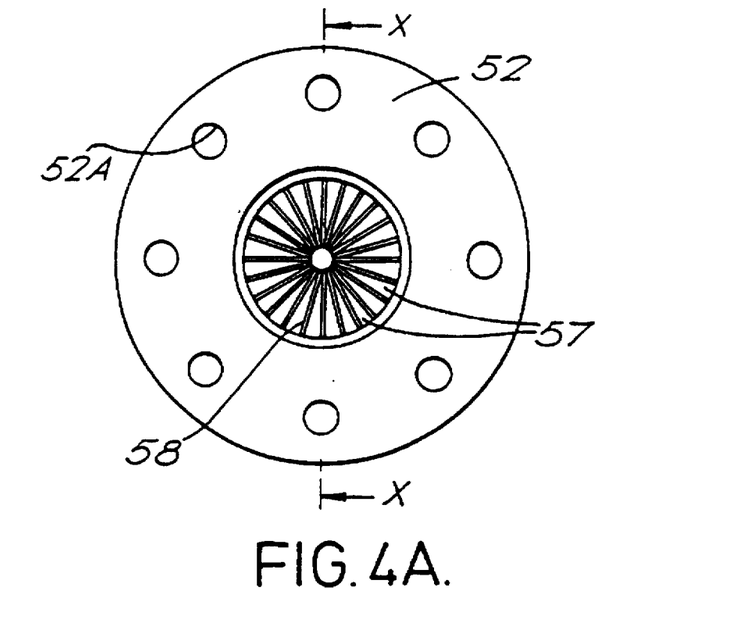
FIGS. 4A and 4B are a cross-sectional view and an end view, respectively, of a third embodiment of the invention.
Figure 4B:
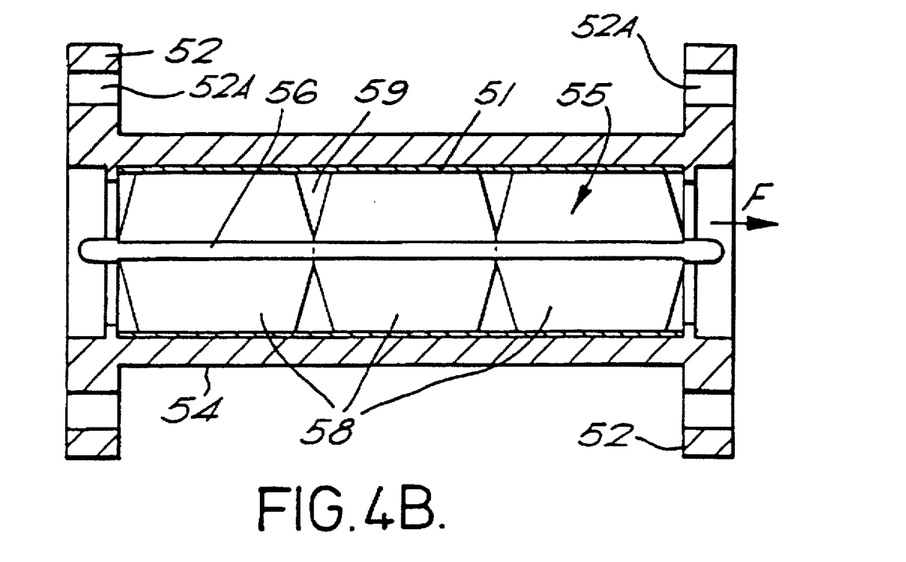

FIG. 4 illustrates a further embodiment of the invention. In this embodiment, which is designed for use in industrial, flanged, pipework systems, a water treatment device is provided with a metallic body 54 including metallic end flanges 52, which can be connected to the end flanges of adjoining pipework by means of fasteners (e.g. bolts) passing through bolt holes 52A.

In this embodiment a dielectric liner 51 is provided within the metallic body 54. Within the metallic body 54, a water separator 55 comprising a central dielectric core 56 and dielectric radiating blades, or flanges 58 are provided. The combination of the dielectric lining 51, the dielectric core 56, and the dielectric blades 58, define a plurality of longitudinally extending channels 57 into which water entering the device is separated and then forced to flow. The water from the respective channels 57 then merges again on leaving the device 60. Preferably, the blades 56 are separated by spaces 59 which cause mixing of the flow from respective channels and increase the turbulent effects within the device. In FIG. 4 24 flanges are shown although in other embodiments different numbers of flanges may be provided.

Preferably the surfaces of the dielectric components 51, 56 and 58 of the device are smooth to avoid deposits forming. However, these components can be shaped or structured to enhance turbulent flow within the device. For example, they could be formed with ridges, or the blades could be configured to define spiral passages so that the water is forced to follow a corkscrew shaped path through the device. By alternating the direction of the spiral for successive sets of blades, passing along the device from the upstream to the downstream end, the water could be forced to follow and alternating left and right hand corkscrew path. This enhances turbulence and mixing of the water from the separate channels in the spaces 59 between successive sets of blades 58.

Figure 5A:
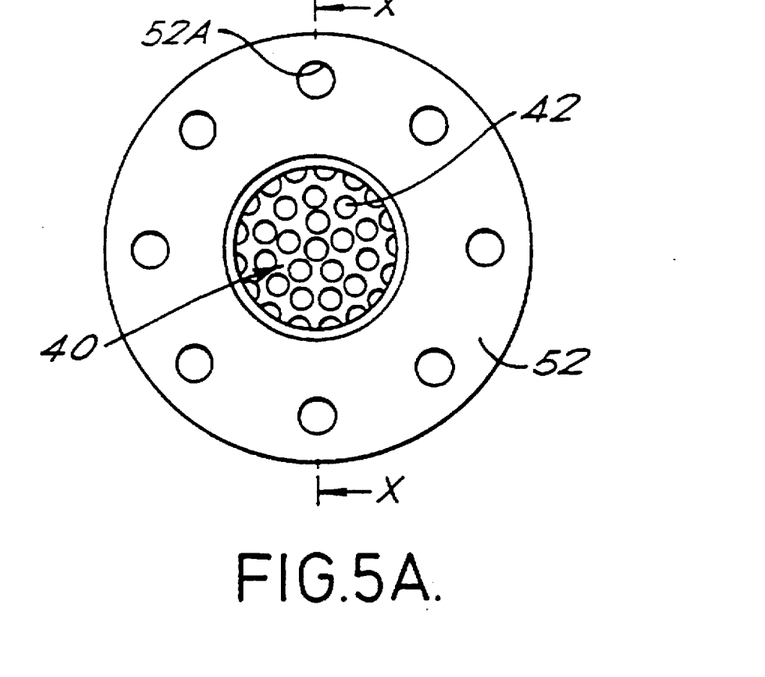
FIGS. 5A and 5B are a cross-sectional view and an end view, respectively, of a fourth embodiment of the invention.
Figure 5B:
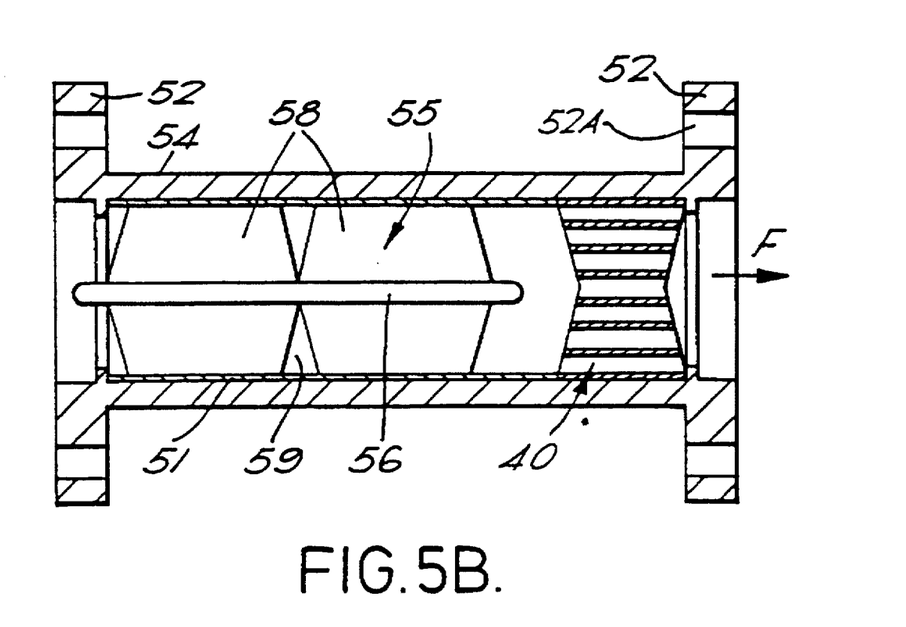

FIG. 5 illustrates a further embodiment where a metallic channel separator 40, as illustrated in FIG. 3, is additionally provided. Direct electrical connection is provided between the metallic channel separator 40 and the metal body 54 with its flanges 52. Once again, like elements are given like reference signs, so that these components need not be described again, and the variants described with respect to the earlier embodiments also apply to the embodiment of FIG. 5.

Figure 6A:
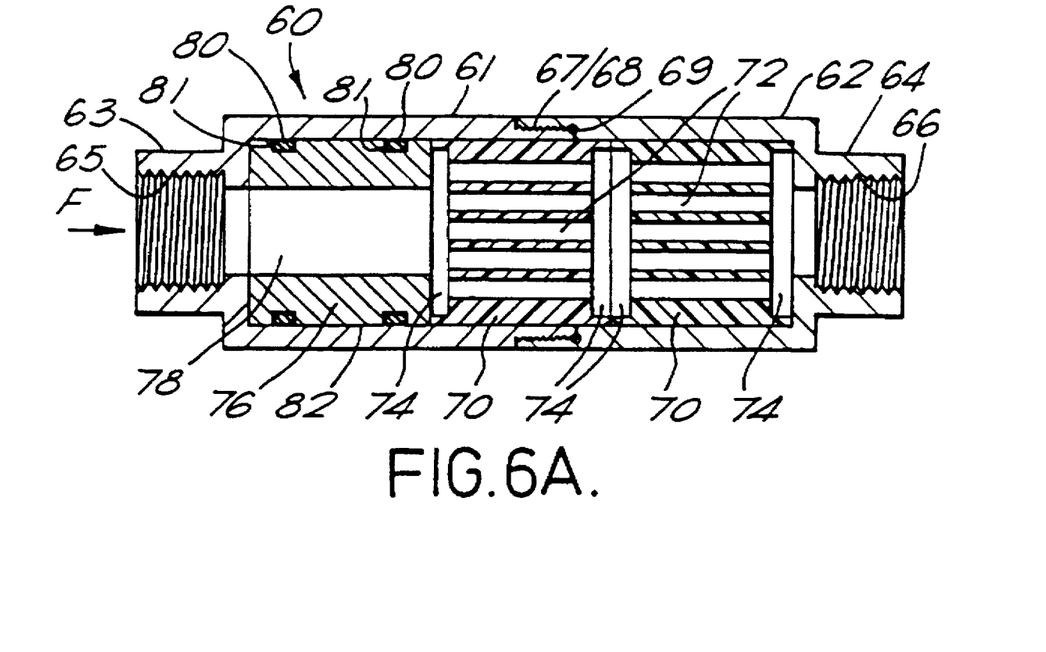
FIGS. 6A and 6B are cross-sectional views of fifth and sixth embodiments of the invention.

FIG. 6A is a schematic cross-sectional view of a fifth embodiment of the invention. In this embodiment the housing of the water treatment device 60 is in two halves 61 and 62, made, for example, of brass. The two halves 61, 62 each include a coupling portion 63, 64, respectively, at one end with an internal thread 65, 66, respectively, for connection to a cooperating coupling, not shown, of a section of pipework, etc. At the other end of each of the two halves 61, 62, complementary coupling threads 67, 68, respectively, are provided to enable the two halves 61, 62 to be joined together. In order to ensure a watertight joint, suitable sealing means, e.g., an O-ring 69, may be provided. Good electrical connection between the windings 67 and 68 should be achieved without additional means. However, if desired, a conductive paste or other means (not shown) could be used to enhance the electrical connection between the two halves 61, 62 of the housing. Before joining the two halves 61, 62 of the housing, various water conditioning elements are inserted in the cavity within the housing.

As shown in FIG. 6A, two dielectric channel separators 70 similar to those described with reference to FIGS. 1 to 3 are provided. Each of the channel defining members 70 is formed with a plurality of bores 26 defining separate channels. In use, water another fluid as appropriate, as mentioned above), flowing along the pipework is caused to separate and flow along the separate channels between upstream and downstream end faces 74 of the channel separator 70 in a flow direction F (e.g. from left to right as viewed in FIG. 6). In this embodiment, each of the end faces 74 is concave, although rather than the dished shape illustrated with reference, for example, to FIGS. 2A and 2B, in this embodiment the end faces 74 are configured as flat bottomed recesses.

In addition to the two dielectric channel separators 70, a sacrificial anode in the form of a channel defining member 76 is also provided, the channel defining member being formed of a substance, for example zinc, suitable for a sacrificial anode. Although in FIG. 6 only a single channel is defined axially down the centre of the anode 76, in alternative embodiments multiple channels, in the manner of the embodiments of FIGS. 3 and 5 could be provided. Likewise, it will be appreciated that rather than providing a multiple channel metallic channel separator as a sacrificial anode in the embodiments of FIGS. 3 and 5, those embodiments could be provided with a sacrificial anode with a single channel.

In order to ensure good electrical contact between the sacrificial anode 76 and the housing 61 at the connecting surface 82, the anode is configured to form a press fit within the housing portion 61. In addition, to ensure that a dry and durable electrical contact is made between the anode 76 and the housing portion 61, O-rings 80 can be provided in, and arranged so as to extend slightly from, recesses 81 in the anode 76.

Figure 6B:
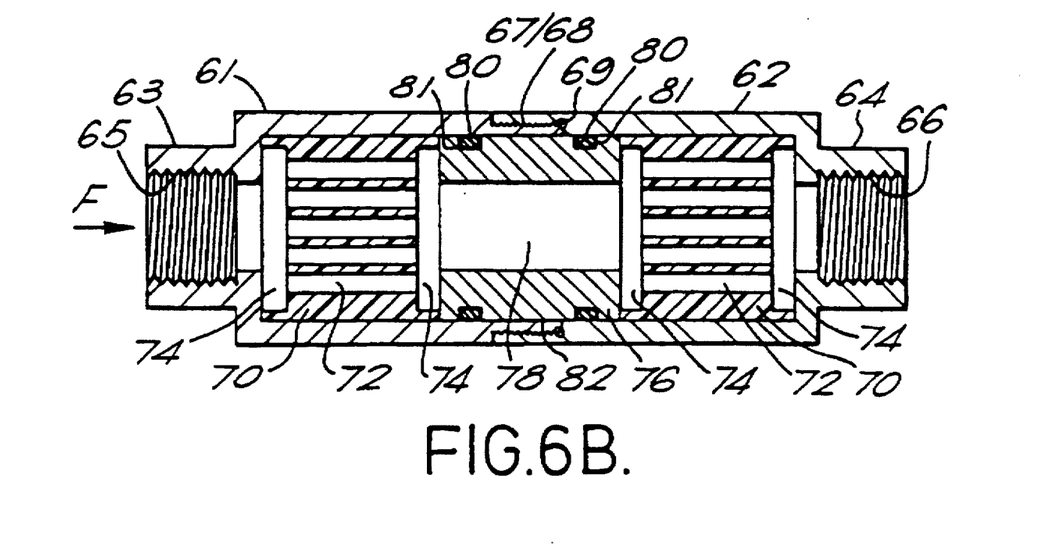

FIG. 6B illustrates a modified version of FIG. 6A. The components of the embodiment of FIG. 6B correspond to those of the embodiment of FIG. 6A and consequently will not be described in detail again. It will be noted that in FIG. 6B, the sacrificial anode, or metallic channel defining member 76, is mounted centrally rather than at one end of the cavity within the device. This provides a number of advantages. Firstly, the O-rings 80 of the member 76 can provide protection in addition to the O-ring 69 against leakage from the join between the two halves 61/62 of the device 60. Also, the dry electrical contact between the member 76 and the two halves 61/62 can enhance the electrical continuity of the device 60. Further, the location of the anode 76 spanning the join between the two halves 61/62 of the device 60 facilitates changing of the anode 76 both during manufacture and in use, for example for changing from a single to a multiple channel anode.

Figure 7A:
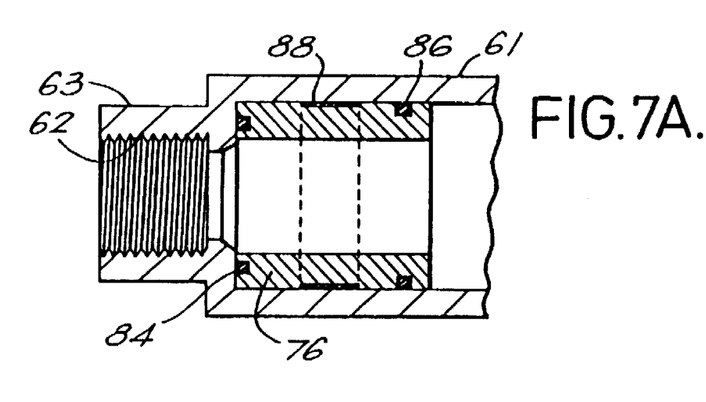
FIGS. 7A to 7D are cross-sectional views of modifications to the embodiments of FIG. 6.
Figure 7B:
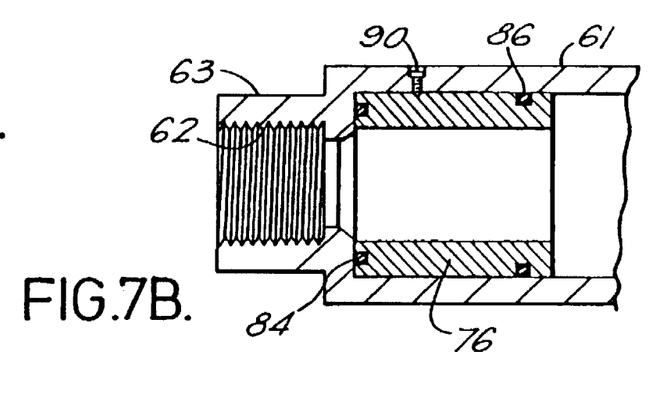
Figure 7C:
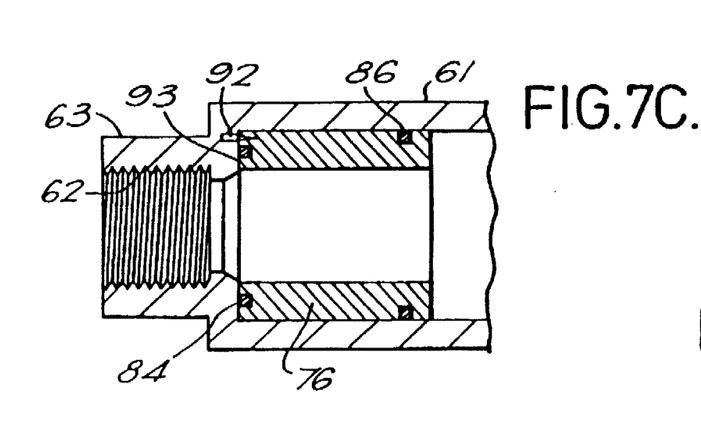
Figure 7D:
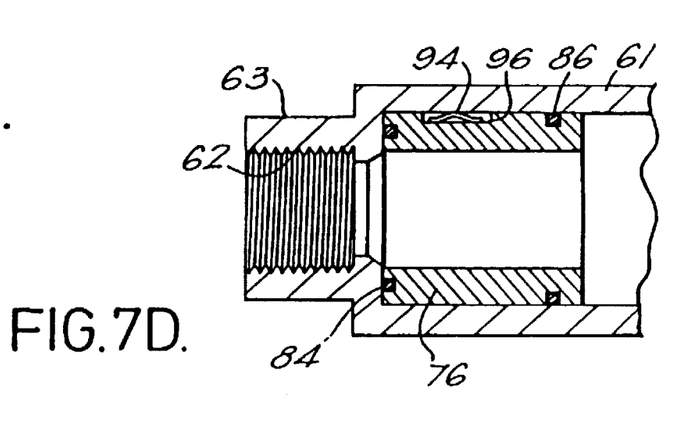

FIGS. 7A to 7B illustrate additional arrangements for ensuring good electrical contact between the anode 76 and the housing portion 61. In FIG. 7A the circumference of the anode is provided with a knurl 88. In FIG. 7B a grub screw 90 of metal or other hard electrically conducting material is screwed through the housing portion 61 and into the anode 76. In FIG. 7C a spike 92 of a hard metal or other hard electrically conducting material is set into the face 93 at the end of the cavity within the housing portion 61, which spike penetrates the relatively soft anode when this is pushed down to the end of the housing portion 61. In FIG. 7D a spring 94 of a resilient metal or other resilient electrical conducting material is located in a recess 96 in the anode 76. One or more of these arrangements can be provided for enhancing the electrical connection between the anode 76 and the housing portion 61 in the embodiment of FIG. 6A.

Preferably, the desired point of contact between the anode 76 and the housing portion(s) 61/62 is kept dry, for example by the use of O-rings. FIGS. 7A to 7D show an alternative to the arrangement of FIG. 6, where both O-rings 80 are provided around the circumference of the anode at different axial positions. In particular, in FIGS. 7A to 7B one O-ring 84 is provided on an end face of the anode 76 and another O-ring 86 is provided adjacent to the other end of the anode around the circumference thereof.

It will be appreciated that one or more of the connecting arrangements of FIGS. 7A to 7D, with suitable location of the O-rings or other sealing means to provide dry electrical contact, can be provided for enhancing the electrical connection between the anode 76 and the housing portions 61/62 in the embodiment of FIG. 6B.

In a specific embodiment of a device as shown in FIGS. 6A or 6B for connection to a ¾ inch pipe (18 mm), the internal diameter of the cavity within the housing portions 67/68 is 1.¼ inches (31 mm) and the cavity is 130 mm long. The sacrificial anode 76 is 60 mm long and each dielectric member 70 is 35 mm long, with each recess forming the concave portions 74 being 5 mm deep. The sacrificial anode 76 and the dielectric members 70 have a diameter to fit within the cavity. The dielectric members 70 are each provided with 8 channels of 6.3 mm diameter. It will be appreciated that the dimensions mentioned above are merely examples of a particular embodiment and they may be adapted for a particular implementation to take account of different pipe sizes and to suit local fluid (water) conditions.

Figure 8A:
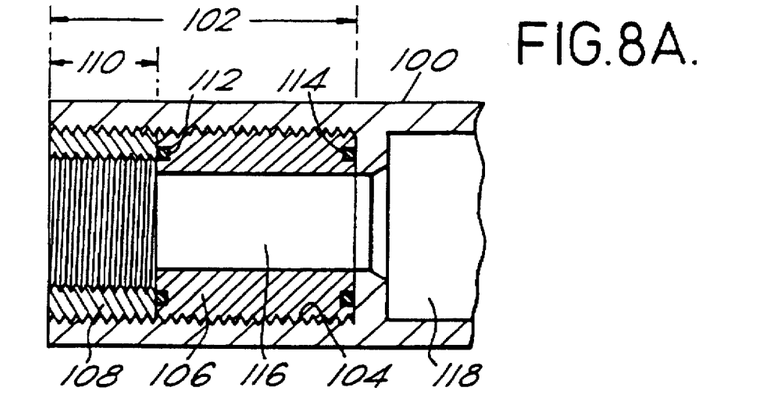
FIGS. 8A and 8B are cross-sectional views of modifications to embodiments of FIG. 6 and FIGS. 1 to 3, respectively.
Figures 8B, 9A:
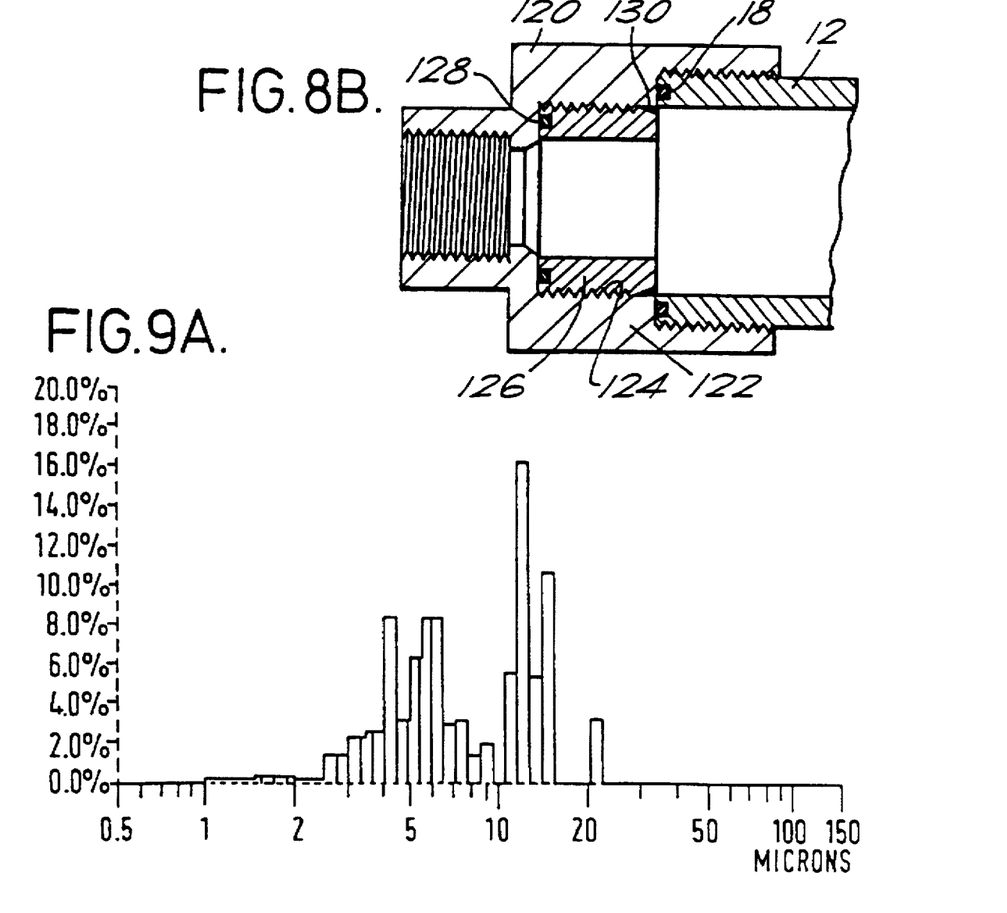
FIGS. 9A and 9B and 9C are diagrams comparing the effectiveness of a prior art device and a device in accordance with the invention.

FIGS. 8A and 8B are schematic cross-sections of a part of alternative arrangements for mounting a sacrificial anode.

FIG. 8A illustrates an embodiment such as that described with reference to FIG. 6, but where a housing portion 100 (e.g., of brass) is elongated to provide a connection portion 102 with an oversized internal thread 104. A sacrificial anode 106 provided with an external thread for cooperating with the internal thread 104 is screwed into the open end of the connecting portion. A reducing socket of a material to match the housing portion 100 (e.g., brass) 106 with a external thread to match the internal thread 104 is then screwed in after the sacrificial anode 106. The thread between the reducing socket 108 and the end portion 110 of the connecting portion 102 can be sealed by an appropriate plumber's sealing material. In order to keep the join between the external thread of the anode and the internal thread 104 dry, and thus to ensure a durable and reliable electrical connection, O-rings 112 and 114 can be provided at the end faces of the anode 106 as illustrated in FIG. 8A. Although the anode is shown as providing a single channel 116, it will be appreciated that it could alternatively provide a plurality of channels as in the embodiments of FIGS. 3 and 5.

FIG. 8B illustrates an embodiment such as that described with reference to FIG. 1, but where an end cap 120 (e.g., of brass) is elongated to provide a portion 122 with an internal thread 124 for receiving a sacrificial anode 126 provided with a cooperating external thread. The anode 126 is screwed into the internally threaded portion 122 before the end cap is screwed onto the end of the housing portion 12. In order to keep the join between the external thread of the anode and the internal thread 104 dry, and thus to ensure a durable and reliable electrical connection, an O-ring 128 and a seal 130 can be provided at the end faces of the anode 106 as illustrated in FIG. 8B. The housing can be sealed to the end cap 120 by an O-ring 18 as in FIG. 1. Although the anode is shown as providing a single channel 116, it will be appreciated that it could alternatively provide a plurality of channels as in the embodiments of FIGS. 3 and 5.

Figure 9B:
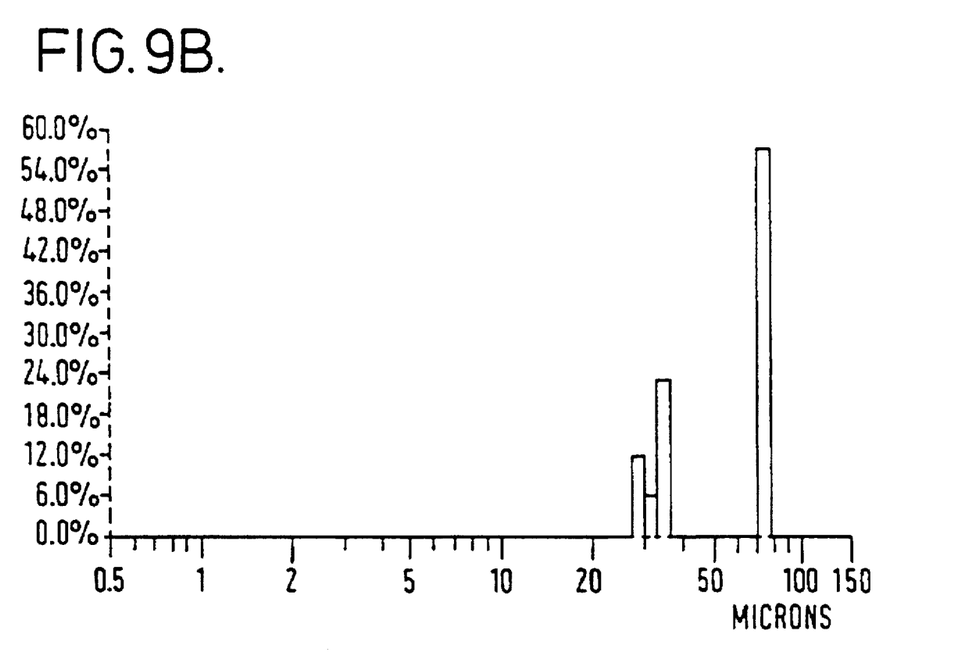
Figure 9C:
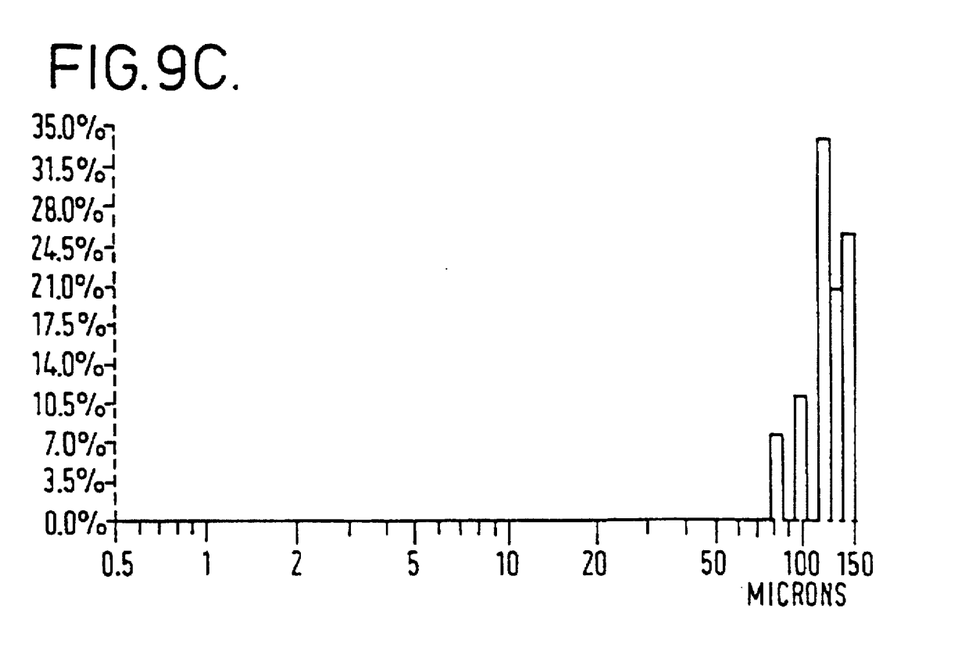

FIGS. 9A, 9B and 9C are graphs illustrating the effectiveness of an example of the present invention versus the prior art. FIGS. 9A, 9B and 9C, respectively, represent the sizes of solid particles within water, before treatment with a water treatment device, after treatment by a prior art device, and after treatment by a device in accordance with the invention. In those Figures, the vertical axis represents percentage values and the horizontal axis represent particle sizes in water. The method used to obtain the results illustrated in the graphs was to analyse by laser the particles suspended in the water both before and after one pass through a device. The analyses show not only the size of the various particles in the water stream but the relative percentage of various particle size groupings.

FIG. 9A represents the probability volume density of particles of various particle sizes within normal tap water before treatment. The median particle size in the water tested was approximately 6.8 µm and the mean particle size was approximately 8.5 µm, with a standard deviation of approximately 4.6 µm.

FIG. 9B illustrates the probability volume density for particle sizes within water one meter downstream from a prior art water treatment device. The prior art water treatment device tested comprised a plastics tube, with brass end caps, the plastics tube containing a open roll, or spiral formed by a rolling sheet of zinc, the zinc spiral being electrically connected to the brass end caps. With this prior art device, the median particle size increased to approximately 72 µm with a mean particle size of approximately 54 µm and a standard deviation of approximately 20 µm. It can be seen therefore that for the particular water sample tested, the sizes of the particles within the water increased as a result of the use of the prior art device.

FIG. 9C is the probability volume density measured one meter downstream of a device in accordance with the invention, specifically a device as illustrated in FIG. 1. With the invention, the increase in particle sizes was dramatic. In particular, the median particle size was approximately 120 µm, with a mean particle size of 123 µm and a standard deviation of 18.6 µm. It will be thus be appreciated that the device as illustrated in FIG. 1 demonstrates a significant and surprising improvement over the prior art device. The further embodiments described herein, also demonstrate similar improvements over the prior art devices.

It is believed that the dielectric channel separator acts as a "Static Generator". As the water flows over the surface of the material, a potential static charge is generated. It is believed that this potential static charge may have an effect on hardness by causing electrically charged colloids in the water to become neutralized leading them to coagulate. Once some particles have precipitated, the small particles formed then provide sites for further precipitation. It is assumed that static will not actually build up on the surface of the dielectric where the fluid is water, because this is an electrical conductor. However, it is believed that a static-like effect is produced as the device is found to be particularly effective when plastics materials (e.g., such as polytetrafluoroethylene (PTFE), nylon, polypropylene, polyvinyl chloride, etc.) are used as the dielectric. Plastics materials are well known as materials which can cause static as a result of friction with other materials. In the preferred embodiments of the invention, PTFE is used. PTFE resists the generation of electrical currents along its surface sometimes referred to as electrical tracking. This material has the added advantage that it makes it possible to obtain very smooth, non-stick surfaces which resist the build-up of deposits on the channel separators. However, other plastics materials or other dielectric materials (e.g., ceramics) which demonstrate suitable properties could be used.

Thus it is believed that potential electrical static charge is generated on the surface of the plastic as some of the kinetic energy in the moving stream of water is converted into both heat and electrical energy. It is believed that the strength of the charge is a function both of the value of the friction of the water and the area of the plastic surface across which the water passes. The static causes a potential imbalance between the surface of the plastic and the water and similarly between the plastic surface and the metal surfaces of pipework which may be already affected by either scale and/or corrosion.

As mentioned above, the device is designed in such a way that turbulence is encouraged in the water passing through, for example by the provision of the concave ends to the channel separators so that, when one or more channel separators have been assembled in series, the water passing through enters a chamber or cavity between them causing turbulence. A useful by-product of this construction is that mixing occurs between the water flowing in different channels, and means that if one of the channels becomes blocked by debris, flow can still be assured via another of the channels. The turbulence and pressure changes in the water caused at the entry and exit to the channels and in the intermediate chamber(s) may cause air and other gases dissolved in the water to form small bubbles (e.g. at low pressure regions on the edges of the channels at the point of entry or downstream of the channels on exiting therefrom and/or in the manner of the effect known as "cavitation") which can form sites for the precipitation of dissolved salts in the water. Also, it is believed that shock waves generated when the bubbles collapse downstream of the device and/or turbulence caused by the device can assist in breaking up any preexisting scale in, for example, pipework downstream of the device. These effects are believed to contribute to the effectiveness of the device. It may be that the turbulence also assists in the generation of the static-type effects mentioned previously.

Thus, there have been described embodiments of devices for treating hard water to prevent the formation of hard water scale or other undesirable crystalline matter by causing a coagulation of colloidal solids which may then act as nuclei for rapid precipitation of the dissolved solids. The invention enables the early precipitation from solution of the various salts or substances which would give rise, under normal circumstances, to crystalline structures. Thus, the incorporation a device in accordance with invention in a water supply line enables the prevention or reduction of the deposition of hard water scale on pipes and heating surfaces.

In general the invention can find application in the treating of water for domestic and industrial water supply to prevent the build-up of scale and other deposits within a pipework system or in appliances and equipment, such as boilers, kettles, water-fed machines, sanitary ware such as urinals, toilets, washbasins, urinals and showers roses, and so on.

An application of the invention relates to the preparation of food and drinks, particularly where heating of water is employed (e.g., in a kettle, drinks vending machine, etc) as the treatment applied to the water is passive and employs no additional chemicals. The use of a device in accordance with the invention enables the coagulation and/or precipitation of substances which are present as colloidal suspensions in water and other potable liquids and which impart an unpleasant taste. If desired, the resulting solid particles can be removed, for example by sedimentation or filtration to make the liquid entirely smooth to the palate. Embodiments of the invention may find application in treating alcoholic and non-alcoholic liquids in order to accelerate normal ageing and maturisation of the liquids as a result of the precipitation of colloidal suspensions of unwanted substances enabling their removal from the liquids.

Another application is in the area of swimming pool maintenance. One of the most important functions of swimming pool filter systems is to keep the pools free of suspended proteins and cloudiness. Very often these substances are colloidal and difficult to remove from the water by traditional filtration. The colloids are too fine to be trapped in all but the finest of filters and if they are retained, quickly raise pressure drops across filtration membranes with serious reduction in flow rates. The invention enables precipitation of these colloids, increasing the particle size and allowing filtration to become much more effective resulting in clearer and healthier pools. Filtration also removes many potential bacteria habitats from the pool water which allows the use of oxidants and sterilising media such as chlorine and bromine to be much reduced. Although not understood fully at this time, the invention appears to lessen the amount of chlorine which evaporates from the surface of pool water thus bringing about savings in the use of such chemicals.

Although particular embodiments of the invention have been described, it will be appreciated that many additions and/or modifications are possible within the scope of the invention.

For example, although the embodiments of FIGS. 1 and 3 are provided with a dielectric channel separator of type described with reference to FIG. 2, they could alternatively be provided with a dielectric channel separator of the type provided in the embodiment of the FIG. 4. Likewise, the embodiments of FIGS. 4 and 5 could alternatively be provided with a dielectric channel separator of the type described with reference to FIGS. 1 to 3. Also, the metallic element which forms a sacrificial anode may define one or more channels as required. It will be appreciated that many other modified structures are possible.

For example, for an application as a submersible unit to be placed near, but not actually connected to the outlet from a fluid (e.g. water) tank, a large model (such as a flanged model described in FIG. 4) could be provided with a dielectric channel separator of the type provided with a plurality of bores (rather than fins) and could additionally be provided with plugs for enabling a user selectively to block certain of the bores or channels in the dielectric channel separators. This would enable the user to adapt the flow rate to a particular implementation and would avoid the need to provide a wide range of different sizes of device for such applications.

The channels of the dielectric channel separators and/or the metallic channel defining means may, for example, be defined along the periphery, rather than through the body of the channel separators or channel defining means (for example giving a star-like cross-section). Also, rather than the straight channels illustrated in the specific embodiments above, the channels may be arranged to follow a non-linear path, for example a path in the form of a spiral or helix. Thus, for example, the channel(s) could be formed in a manner similar to an external thread on a body forming the channel separator or channel defining members.

Also, although the specific embodiments described with a screw coupling for connection, for example to pipework, have an internal thread, it will be appreciated that a male coupling with an external thread may be provided instead. Also, instead of a flange or screw coupling as described above, a coupling member in the form of a spigot for use with a "quick-fit" type connector could be used.

Also, rather than using a dielectric material with bores to define the dielectric channel separator, a bundle of, for example, PTFE tubes could be used instead to define a plurality of coextensive channels.

Although in the embodiments described above the end caps are connected directly to the body of the device which defines the cavity for receiving the channel separators, in other embodiments the caps could be connected to a housing containing the device body.

Also, as explained above, different embodiments of the invention may be provided with 1, 2, 3, etc., dielectric channel separators and with 0, 1, or 2 metallic channel separators. If more than two channel separators are provided, then they should be electrically connected to each other and to any connecting pipework in order to achieve the desired sacrificial anodic effect.

Although the invention has been described particularly for treating hard water, it will be appreciated that it can also be applied to the treatment and conditioning of other liquids and fluids.

We claim:

1. A fluid treatment device comprising:

a fluid inlet;

a fluid outlet;

an enclosure defining a cavity extending between said inlet and said outlet;

a dielectric channel defining element comprising dielectric material located in said cavity between inlet and said outlet and extending part way along said cavity in the direction of flow from said inlet to said outlet, said dielectric channel defining element dividing said cavity into a plurality of first elongate channels which are mutually coextensive for at least part of their length in said flow direction and are at least partially bounded by dielectric material; and a further channel defining element located in said cavity and extending over a further part of said cavity in said flow direction, said further channel defining element dividing said cavity into a plurality of second elongate channels which are mutually coextensive for at least part of their length in said flow direction, said dielectric and further channel defining elements being located adjacent to one another in said flow direction, and having opposed end faces configured to define a turbulence chamber therebetween.

2. A device according to claim 1, wherein said further channel defining element forms a metallic channel defining element comprising a metal.

3. A device according to claim 1, wherein said dielectric material is a plastics material.

4. A device according to claim 3, wherein said plastics material is polytetrafluoroethylene.

5. A device according to claim 1, wherein said dielectric channel defining element comprises a block of dielectric material having a cross-section to fit within said cavity, said block of dielectric material being formed with a plurality of bores extending in said direction of flow, each bore defining a respective one of said channels.

6. A device according to claim 5, wherein an upstream and/or a downstream one of said end faces of said block of dielectric material is concave.

7. A device according to claim 1, wherein said dielectric channel defining element comprises an elongate dielectric core extending substantially in said flow direction, a plurality of dielectric flanges extending outwardly therefrom and a dielectric tubular member configured to fit within said cavity, said tubular member being formed integrally with an outer end of said outwardly extending flanges or cooperating with said outer end of said outwardly extending flanges to define a plurality of said first elongate channels about said core, which said first elongate channels extend in said flow direction.

8. A device according to claim 1, further comprising a plurality of said dielectric and further channel defining elements located one after another in said flow direction in said cavity, each said channel defining element comprising an aligning element for aligning said channels of said adjacent channel defining elements.

9. A device according to claim 1, wherein said end faces also define an opening of each said first and second channels, each said opening having an edge, wherein one said edge of at least one of said channel openings at an upstream or downstream end of one said end face of one of said channel defining elements is sharp, or otherwise formed so as to encourage turbulent flow of a fluid entering or exiting via said opening.

10. A device according to claim 1 to be mounted in-line in a pipeline, the device comprising a connecting element at said inlet and/or said outlet for connecting said device to said pipeline.

11. A device according to claim 10, wherein said connecting element comprises a flange with bolt holes for cooperating with a flange on a connecting section of pipe.

12. A device according to claim 11, wherein said connecting element comprises a screw fitting for connection to a co-operating fitting on a connecting section of pipe.

13. A device according to claim 12, wherein said connecting element comprises an end cap having a first screw thread and either said enclosure defining a cavity or a housing containing said enclosure defining a cavity has a second screw thread for cooperating with said first screw thread on said end cap for removably screwing said end cap onto said enclosure defining said cavity or to said housing.

14. A device according to claim 1 to be mounted in-line in a pipeline, said device further comprising;
said metallic channel defining element having an end surface provided with a ridge;
a connector at said inlet and/or said outlet for connecting said device to said pipeline, wherein said connector comprises a metallic end cap having a screw thread; and
said enclosure defining a cavity or a housing containing said enclosure defining a cavity being provided with a screw thread for cooperating with said screw thread on said end cap for removably screwing said end cap onto said enclosure defining said cavity or to said housing;
said dielectric channel defining element having a degree of resilience and said dielectric channel defining element and said metallic channel defining element each being configured to be slightly over-length, whereby, on screwing on said end cap, said ridge on said end surface of said metallic channel defining element is urged to cut into a surface of said end cap to provide good electrical connection between said end cap and said metallic channel defining element.

15. A device according to claim 1, further comprising two housing portions with mutually cooperating screw threads for enabling said housing portions to be screwed together to form said enclosure.

16. A device according to claim 15, wherein said housing portions are metallic and wherein at least one said further channel defining element is provided and is metallic and at least two of said dielectric channel defining elements are provided, said metallic channel defining element being located within said cavity so as to span a joint between said two housing portions where the latter are screwed together, said metallic channel defining element comprising a sealing element for ensuring a dry electrical contact between said metallic channel defining element and said housing portions.

17. A pipework system comprising a device according to claim 1 connected in a pipeline.

18. A pipework system according to claim 17, wherein the combined cross-sectional area of said channels is not less that the cross-sectional area of the pipeline connected thereto.

19. A pipework system according to claim 18, wherein the combined cross-sectional area of said channels is less than the cross-sectional area of the pipeline connected thereto in order to cause an increase in pressure in a fluid flowing through the device at the point of entry into the channels.

20. A method of treating water or other fluids comprising passing said water or fluid through a device as claimed in claim 1.

21. A fluid treatment device comprising:
a fluid inlet;
a fluid outlet;
an enclosure defining a cavity extending between said inlet and said outlet;
a dielectric channel defining element comprising dielectric material located in said cavity between said inlet and said outlet and extending part way along said cavity in the direction of flow from said inlet to said outlet, said dielectric channel defining element dividing said cavity into a plurality of first elongate channels which are mutually coextensive for at least part of their length in said flow direction and are at least partially bounded by dielectric material; and
a metallic channel defining element comprising a metal located in said cavity and extending over a further part of said cavity in said flow direction, said metallic channel defining element dividing said cavity into a plurality of further elongate channels which are mutually coextensive for at least part of their length in said flow direction.

22. A fluid treatment device according to claim 21 wherein said dielectric and metallic channel defining elements are located adjacent to one another in said flow direction, and have opposed end faces configured to define a turbulence chamber therebetween.

23. A device according to claim 21, wherein said metallic channel defining element comprises a block of metal formed with a plurality of bores extending in said flow direction, each bore defining a respective one of said further channels.

24. A device according to claim 21, wherein an upstream and/or a downstream end face of at least one of said dielectric or metallic channel defining elements is concave.

25. A device according to claim 22, wherein a first said metallic channel defining element is located in said cavity adjacent to said inlet and a second said metallic channel defining element is located in said cavity adjacent to said outlet, one or more of said dielectric channel defining elements being located between said first and second metallic channel defining elements.

26. A device according to claim 22, comprising an arrangement ensuring good electrical contact between said metallic channel defining element and a metal component of a housing or end cap of said device.

27. A device according to claim 26, wherein said arrangement ensuring good electrical contact comprises mutually cooperating screw threads.

28. A device according to claim 26, wherein said arrangement ensuring good electrical contact comprises a mechanical arrangement for increasing contact pressure between said metallic channel defining element and said metallic component and/or for causing scoring or penetration of said metallic channel defining element and/or said metallic component.

29. A device according to claim 26, wherein said arrangement ensuring good electrical contact comprises a seal for keeping a contact area and/or said component dry.

* * * * *